United States Patent Office 3,598,863
Patented Aug. 10, 1971

3,598,863
PREPARATION OF HYDROXYBENZOPHENONE
BENZOATE
Edwin J. Strojny, Midland, and James R. Dewald, Bay City, Mich., assignors to The Dow Chemical Company, Midland, Mich.
No Drawing. Filed June 10, 1968, Ser. No. 735,569
Int. Cl. C07c 69/78, 67/00
U.S. Cl. 260—476                                          8 Claims

ABSTRACT OF THE DISCLOSURE

The benzoate of hydroxybenzophenone is obtained as a principal reaction product by heating a mixture of benzoic anhydride, cupric benzoate, at least one of iron, zinc, cobalt, or magnesium benzoate, and optionally a small amount of free benzoic acid at 220–320° C. in the presence of molecular oxygen. The product can be hydrolyzed to make hydroxybenzophenone, a useful chemical intermediate and fungicide.

BACKGROUND OF THE INVENTION

This invention concerns a chemical process whereby a benzoic acid compound is converted to a substituted benzophenone. More particularly, it concerns a process for making hydroxybenzophenone benzoate from benzoic anhydride using a mixed metal benzoate catalyst.

The process whereby phenyl benzoate or phenol is produced by the copper-catalyzed oxidation of benzoic acid is described in patents such as Kaeding et al., Re. 24,848 and Toland, 2,762,838. It is known that a mixture of benzoic acid and benzoic anhydride can be used in such a process to obtain certain advantages. The catalyst is usually cupric benzoate combined with a cocatalyst or promoter such as magnesium benzoate. Such a process utilizing a benzoic acid-benzoic anhydride feed mixture is described in the pending application of one of us with another, Ser. No. 715,967, filed Mar. 26, 1968.

It is also known that the general process for making phenol from benzoic acid as described above produces certain by-products such as polyphenols, salicyclic acid compounds, and dihydric phenol products. By varying the reaction conditions, byproduct formation can be increased or decreased or the production of a particular byproduct can be enhanced.

SUMMARY OF THE INVENTION

It has now been discovered that by varying the conditions of the general process described above, specifically by employing benzoic anhydride as the essential reactant in place of benzoic acid, an entirely different type of reaction is encouraged and a different kind of reaction product is obtained. It has been found that a mixture of benzoic anhydride with 0.5–5 weight percent each of cupric copper and at least one cocatalyst metal of the group magnesium, iron, zinc and cobalt present as their respective benzoates, the mixture optionally containing up to about six weight percent of free benzoic acid, when heated at 220–320° C. in the presence of at least sufficient molecular oxygen to maintain the copper component in the cupric state, produces substantial quantities of hydroxybenzophenone benzoate as a principal reaction product upon operation for a relatively protracted reaction time. Reaction times of at least about 2 hours are required. Other products of the reaction are phenol and phenyl benzoate. The hydroxybenzophenone produced is essentially a mixture of the ortho and para isomers in about equal proportions.

A convenient mode of operation comprises a continuous process wherein the reaction mixture is heated as described above while compounds more volatile than the hydroxybenzophenone benzoate and some benzoic anhydride are continuously distilled from it and the volume of the residual mixture is maintained at an essentially constant level by addition of benzoic acid and benzoic anhydride in proportions such that the concentration of free benzoic acid in the reaction mixture does not exceed about six weight percent. Hydroxylbenzophenone benzoate can be separated continuously or at intervals by distillation, crystallization, or other conventional means from the residual mixture in the reactor.

DETAILED DESCRIPTION

The process of this invention can be operated at moderate subatmospheric or superatmospheric pressure. Since normal operation includes distillation of volatiles such as phenol, benzoic acid and phenyl benzoate from the mixture in the course of the reaction, the pressure is essentially determined by the reaction temperature. Preferred temperatures lie in the range 250–300° C. and it is most preferred to operate at 250–270° C. and at about atmospheric pressure.

Although the process is operable when the concentration of free benzoic acid in the reaction mixture is maintained at 0–6 weight percent, best results are obtained when the free acid concentration is 0.1–2 weight percent. These conditions imply operation at essentially anhydrous reaction conditions. Since some benzoic acid is produced during the reaction, the acid concentration can be controlled by distilling the free acid from the mixture at an appropriate rate. In continuous operation, a mixed feed of benzoic anhydride and benzoic acid is continuously added to the reaction mixture in order to regenerate the cupric benzoate which is decomposed in the reaction. Such a mixed feed may contain up to about 40 weight percent of free acid although 5–25 percent is usually enough at preferred catalyst concentrations.

Preferable catalyst and cocatalyst concentrations are 0.5–2 percent by weight of each metal, i.e., copper and at least one of the metals magnesium, iron, zinc, and cobalt present in the reaction mixture as the respective benzoates. Magnesium is the preferred cocatalyst.

Somewhat surprisingly, catalysts which are operable in the oxidation of benzoic acid to phenyl benzoate and/or phenol are not necessarily operable in the present process. For example, cupric benzoate alone or in combination with the benzoate of another metal such as lithium or nickel is an effective catalyst in the old process, but such a catalyst produces either no hydroxy-benzophenone benzoate or only trace amounts in the present process.

A reaction time of at least two hours is required to obtain a significant concentration of the benzophenone product. Preferably, a minimum reaction time of three hours is employed. In batch operation, a preferred reaction time may be about 3–15 hours, depending upon the reaction temperature and benzoic acid concentration, while in continuous operation, an optimum concentration of product in the reaction mixture may be reached in the same length of time and that concentration then may be maintained by appropriate continuous removel of product from the mixture and proper feed adjustments during the continuing process.

Since byproducts of the reaction include phenylbenzoate and phenol as well as some free benzoic acid, it is believed that several reactions are probably taking place during the process. These could include the known copper-catalyzed oxidation of benzoic anhydride to yield phenyl benzoate and possibly some phenol, particularly when some free benzoic acid is present. Other reactions, for example, an acylation of phenyl benzoate, may also occur.

Hydroxybenzophenone benzoate and the free hydroxybenzophenone isomers which are easily obtained by conventional hydrolysis of the ester have various known uses, e.g., as light stabilizers in polyolefins. p-Hydroxybenzophenone is a known fungicide. These compounds are also valuable chemical intermediates for making derivatives having these and other utilities.

Example 1

The reactor was essentially an upright glass pipe of 5 cm. inside diameter by 60 cm. long with a detachable section on the top of 10 cm. inside diameter by 12 cm. height. The reactor was heated by external electrical heaters and it had a gas inlet and a sampling valve at the bottom and a feed inlet at the top. An outlet at the top was connected to a distillation column whereby benzoic acid and less volatile products could be separated from phenol and other low boilers.

One liter (molten) of reaction mixture containing 78 percent by weight of benzoic anhydride, one percent of free benzoic acid, 4.7 percent of cupric benzoate, and 16.5 percent of magnesium benzoate was made up and put in the reactor. This corresponds to an 80 percent anhydride-20 percent acid (free and combined) mixture plus one percent combined copper and 1.5 percent combined magnesium. This mixture was heated at 260° C. while a stream of an air-nitrogen mixture containing 6.8 percent of oxygen was bubbled through it at 210 liters per hour. As phenyl benzoate and benzoic acid were distilled from the reactor during the course of the reaction, a feed mixture of 80 percent by weight of benzoic anhydride and 20 percent of benzoic acid was continuously added to the reaction mixture to maintain both its volume and the concentration of free acid at about the original levels. The average feed rate was 212 g. per hour. The average composition of the distillate remained essentially constant after 3 hours at about 15–25 weight percent of phenyl benzoate, 35–40 percent of benzoic anhydride, and 40–45 percent of benzoic acid while the concentrations of compounds in the residual mixture in the reactor varied as shown in the following table, concentrations being given in weight percent. Analyses were largely by infrared absorption spectroscopy with specialized analyses and separations by mass spectrometry and gas liquid chromatography.

| Time, hours | Benzoic acid | Benzoic anhydride | Phenyl benzoate | Benzoate of hydroxybenzophenone [1] |
|---|---|---|---|---|
| 1 | 1.9 | 74.0 | 2.7 | <1 |
| 3 | 2.8 | 63.6 | 6.0 | 7.8 |
| 5 | 2.9 | 53.2 | 6.2 | 15.7 |
| 7 | <1 | 39.3 | 6.9 | 24.5 |
| 10 | <1 | 26.6 | 5.1 | 35.3 |

[1] Mixture of ortho and para isomers in about equal amounts.

The metal benzoates and a small amount of higher molecular weight material which gradually accumulated made up the remainder of the reactor contents.

Example 2

The procedure of Example 1 was repeated using a starting mixture of 68 percent by weight of benzoic anhydride, 4.7 percent of cupric benzoate, 16.5 percent of magnesium benzoate, and 11 percent of free benzoic acid. A feed of 30 percent benzoic acid and 70 percent of benzoic anhydride was added during the reaction as before to maintain a reaction mixture of constant volume, and an air-nitrogen mixture was bubbled through the reaction mixture as in Example 1. Concentrations of free benzoic acid, benzoic anhydride, phenyl benzoate, and hydroxybenzophenone benzoate in the reaction contents were determined periodically as previously described and these values are summarized in the table which follows. The benzoate of hydroxybenzophenone was a mixture of the ortho and para isomers as before.

| Time, hours | Benzoic acid | Benzoic anhydride | Phenyl benzoate | Benzoate of hydroxybenzophenone |
|---|---|---|---|---|
| 1 | 18.5 | 49.7 | 8.5 | <1 |
| 2 | 8.8 | 54.8 | 10.2 | <1 |
| 4 | 5.2 | 56.0 | 10.7 | 2.8 |
| 6 | 3.4 | 50.3 | 12.0 | 8.9 |
| 8 | 2.3 | 41.8 | 19.5 | 14.9 |
| 10 | 1.7 | 31.0 | 27.0 | 20.0 |

It is seen that the concentration of the benzoate of hydroxybenzophenone became significant only after the free benzoic acid concentration fell below about five percent and it became substantial only when the free acid content approached one percent.

An experiment was run under conditions otherwise similar to those of Examples 1 and 2 except that the concentration of free benzoic acid in the reactor was maintained at about 20–40 percent by using a feed of 80 percent benzoic acid and 20 percent of benzoic anhydride. No detectable concentration of hydroxybenzophenone benzoate was present in the reactor contents after 12 hours of operation.

Examples 3–6

A number of batch reactions were run in which mixtures of benzoic anhydride and various metal benzoates were heated in 50 ml. flask reactors at 270° C. for four hours and the resulting mixtures were analyzed by infrared absorption spectrometry. Air was bubbled through the molten mixtures at 46 ml./minute during the reaction period. In the results summarized in the following table, quantities are expressed in thousandths of a gram mole.

| Example No. | Starting mixture cocatalyst | | | Ketone benzoate in product [1] |
|---|---|---|---|---|
| | Cu | Metal Amount | Anhydride | |
| 3 | 8.17 | Mg 16.5 | [2] 100 | 12.6 |
| 4 | 8.17 | Fe 39.2 | 100 | 3.9 |
| 5 | 8.17 | Zn 32.0 | 132 | 10.7 |
| 6 | 8.17 | Co 33.2 | 143 | 8.8 |

[1] Benzoate of ortho and para hydroxybenzophenone.
[2] 50 millimoles of phenyl benzoate also present.

Comparable experiments wherein other metal cocatalysts such as lithium benzoate or nickel benzoate were used in combination with copper produced no measurable hydroxybenzophenone benzoate. Similarly, experiments wherein the metal catalyst was solely cupric benzoate or solely magnesium benzoate yielded products containing very little, if any, hydroxybenzophenone benzoate.

We claim:
1. A process for making hydroxybenzophenone benzoate which comprises heating a reaction mixture of benzoic anhydride, 0–6 weight percent of free benzoic acid, and 0.5–5 weight percent each of cupric copper and at least one cocatalyst metal of the group magnesium, iron, zinc, and cobalt wherein said copper and said metal are present as their benzoate salts at a temperature of 220–320° C. in the presence of at least sufficient molecular oxygen to maintain said copper in the cupric state and for a reaction time sufficient to obtain a substantial quantity of hydroxybenzophenone benzoate in said reaction mixture and separating hydroxybenzophenone benzoate from the reaction mixture.

2. The process of claim 1 wherein the reaction time is at least about two hours.

3. The process of claim 1 wherein the metal benzoate is magnesium benzoate.

4. The process of claim 1 wherein the reaction mixture is heated at 250–300° C.

5. A process as described in claim 1 wherein compounds more volatile than hydroxybenzophenone benzoate are distilled continuously from the reaction mixture and the volume of said reaction mixture is maintained at an essentially constant level by adding thereto a mixture of benzoic anhydride and benzoic acid in proportions whereby the concentration of free benzoic acid in said mixture is maintained below about 6 percent by weight of said reaction mixture.

6. The process of claim 4 wherein the concentration of free benzoic acid in the reaction mixture is maintained at 0.1–2 percent by weight of said reaction mixture.

7. The process of claim 4 wherein the metal benzoate is magnesium benzoate.

8. The process of claim 4 wherein the reaction mixture is heated at 250–300° C.

References Cited

UNITED STATES PATENTS

| 2,727,926 | 12/1955 | Kaeding et al. | 260—476 |
| 3,277,184 | 10/1966 | Rylond et al. | 260—621G |
| 3,349,134 | 10/1967 | Blom et al. | 260—621G |

FOREIGN PATENTS

| 627,445 | 1/1963 | Belgium | 260—621G |
| 176,915 | 2/1964 | U.S.S.R. | 260—621G |

CHARLES B. PARKER, Primary Examiner

J. L. DAVISON, Assistant Examiner

U.S. Cl. X.R.

260—591, 621